(12) United States Patent
Rubin

(10) Patent No.: US 7,899,674 B1
(45) Date of Patent: Mar. 1, 2011

(54) GUI FOR THE SEMANTIC NORMALIZATION OF NATURAL LANGUAGE

(75) Inventor: Stuart Harvey Rubin, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1066 days.

(21) Appl. No.: 11/668,831

(22) Filed: Jan. 30, 2007

Related U.S. Application Data

(63) Continuation-in-part of application No. 11/506,269, filed on Aug. 11, 2006.

(51) Int. Cl.
*G10L 21/00* (2006.01)

(52) U.S. Cl. ............ 704/270.1; 715/273; 715/257; 715/243; 704/9; 704/275; 704/273; 704/272; 704/270; 704/260; 704/257; 704/251; 704/235; 704/200; 704/10; 704/1; 463/30; 345/418

(58) Field of Classification Search ......... 704/235, 704/9, 251, 275, 273, 272, 270, 260, 257, 704/200, 10, 1; 715/257, 723, 243; 463/30; 345/418
See application file for complete search history.

(56) References Cited

U.S. PATENT DOCUMENTS

| | | | | |
|---|---|---|---|---|
| 5,737,724 A * | 4/1998 | Atal et al. | | 704/251 |
| 5,748,841 A * | 5/1998 | Morin et al. | | 704/257 |
| 5,842,167 A * | 11/1998 | Miyatake et al. | | 704/260 |
| 5,946,647 A * | 8/1999 | Miller et al. | | 704/9 |
| 5,999,895 A * | 12/1999 | Forest | | 704/1 |
| 6,006,183 A * | 12/1999 | Lai et al. | | 704/235 |
| 6,012,030 A * | 1/2000 | French-St. George et al. | | 704/275 |
| 6,184,879 B1 * | 2/2001 | Minemura et al. | | 715/723 |
| 6,195,637 B1 * | 2/2001 | Ballard et al. | | 704/235 |
| 6,324,511 B1 * | 11/2001 | Kiraly et al. | | 704/260 |
| 6,332,122 B1 * | 12/2001 | Ortega et al. | | 704/270 |
| 6,401,060 B1 * | 6/2002 | Critchlow et al. | | 704/1 |
| 6,405,162 B1 * | 6/2002 | Segond et al. | | 704/9 |
| 6,424,935 B1 * | 7/2002 | Taylor | | 704/10 |
| 6,456,274 B1 * | 9/2002 | Van Hemert | | 345/418 |
| 6,523,008 B1 * | 2/2003 | Avrunin et al. | | 704/273 |
| 6,697,777 B1 * | 2/2004 | Ho et al. | | 704/235 |
| 6,904,405 B2 * | 6/2005 | Suominen | | 704/235 |
| 6,983,239 B1 * | 1/2006 | Epstein | | 704/9 |
| 7,076,429 B2 * | 7/2006 | Basson et al. | | 704/272 |
| 7,155,391 B2 * | 12/2006 | Taylor | | 704/257 |
| 7,222,299 B1 * | 5/2007 | Lim et al. | | 715/273 |
| 7,280,964 B2 * | 10/2007 | Wilson et al. | | 704/251 |
| 7,318,031 B2 * | 1/2008 | Bantz et al. | | 704/251 |

(Continued)

*Primary Examiner* — Richemond Dorvil
*Assistant Examiner* — Michael C Colucci
(74) *Attorney, Agent, or Firm* — Kyle Eppele; J. Eric Anderson

(57) ABSTRACT

A graphical user interface for a semantic normalizer of natural language comprising: a link to a preference menu, in which a user may set the semantic normalizer to operate in a predictive or learning mode; an input textbox disposed to display user-typed text in a first font color and user-spoken text in a second font color; a semantic echo textbox disposed to display semantically normalized text in a third font color, wherein the first, second, and third font colors are different from each other; graphical buttons that are only enabled when the semantic normalizer is in learning mode, wherein the graphical buttons may be selected by the user after the user has been prompted by the semantic normalizer to verify the accuracy of the semantically normalized text, the graphical buttons comprising a "Yes" button, a "No" button, and an "Enter Correction" button.

5 Claims, 3 Drawing Sheets

U.S. PATENT DOCUMENTS

| | | | |
|---|---|---|---|
| 7,324,947 B2 * | 1/2008 | Jordan et al. | 704/275 |
| 7,363,215 B1 * | 4/2008 | Jamieson | 704/10 |
| 7,386,453 B2 * | 6/2008 | Polanyi et al. | 704/270 |
| 7,636,884 B2 * | 12/2009 | Goffin | 715/243 |
| 7,668,718 B2 * | 2/2010 | Kahn et al. | 704/270 |
| 2002/0111794 A1 * | 8/2002 | Yamamoto et al. | 704/200 |
| 2002/0178001 A1 * | 11/2002 | Balluff et al. | 704/235 |
| 2003/0212547 A1 * | 11/2003 | Engelke et al. | 704/200 |
| 2005/0283726 A1 * | 12/2005 | Lunati | 715/533 |
| 2006/0025214 A1 * | 2/2006 | Smith | 463/30 |
| 2008/0255850 A1 * | 10/2008 | Cross et al. | 704/275 |

* cited by examiner

GUI FOR THE SEMANTIC NORMALIZATION OF NATURAL LANGUAGE

CROSS-REFERENCE TO RELATED APPLICATIONS

This application is a continuation-in-part of U.S. application Ser. No. 11/506,269, filed 11 Aug. 2006, entitled "Semantic Normalizer for Natural Language" (Navy Case # 97356), hereby incorporated by reference herein in its entirety for its teachings.

FEDERALLY-SPONSORED RESEARCH AND DEVELOPMENT

This GUI for the semantic normalization of natural language was developed with federal funds and is assigned to the United States Government. Licensing and technical inquiries may be directed to the Office of Patent Counsel, Space and Naval Warfare Systems Center, San Diego, Code 20012, San Diego, Calif., 92152; telephone (619) 553-3001, facsimile (619) 553-3821. Reference Navy Case No. 97201.

BRIEF DESCRIPTION OF THE DRAWINGS

Throughout the several views, like elements are referenced using like references.

DETAILED DESCRIPTION OF EMBODIMENTS

Figure 1:
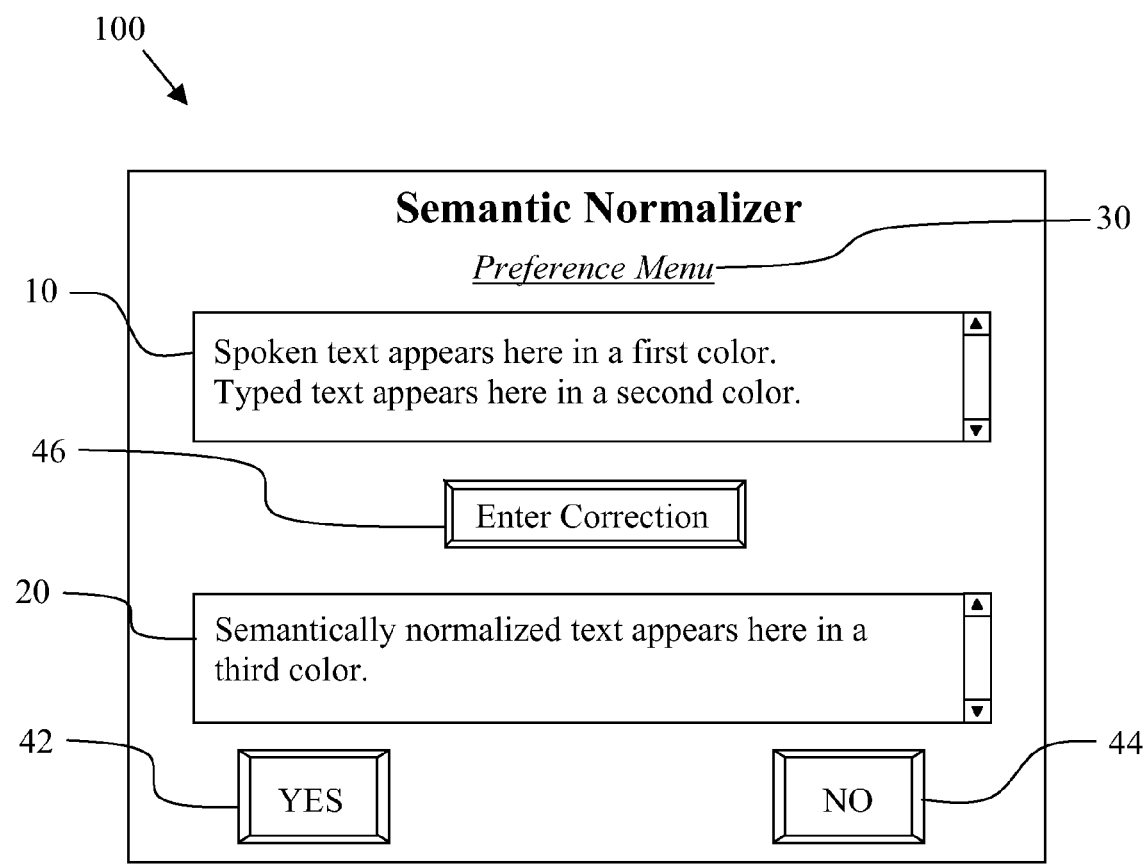
FIG. 1 shows an embodiment of a GUI for a natural language semantic normalizer.

FIG. 1 shows a graphical user interface (GUI) 100 for a semantic normalizer of natural language. The GUI 100 allows for spoken or typed text from a user to be displayed in an input textbox 10. The semantically normalized form of the user-entered text, as generated by the semantic normalizer, may then be displayed in a semantic echo textbox 20. The GUI 100 also allows the user, via a preference menu 30, to set the semantic normalizer to operate in either a predictive mode a learning mode, as described in more detail below. When the semantic normalizer is in learning mode, graphical buttons comprising a "Yes" button 42, a "No" button 44, and an "Enter Correction" button 46 are enabled on the GUI 100, which allow the user to accept, reject, and/or correct a semantic echo.

The input textbox 10 is disposed to display user-typed text in a first font color and user-spoken text in a second font color. For example, user-typed text may be displayed in green and user-spoken text in blue. Varying the textual color according to the source of the text (i.e. spoken or typed) allows the user to know the origin of the text to which the semantic echo refers. The semantic echo textbox 20 is disposed to display semantically normalized text in a third font color. For example, text that has been transformed into a semantically normalized form may appear in red font in the semantic echo textbox 20. The colors green, blue, and red may be used as the default colors of the first, second, and third colors respectively. However, the font colors of user-typed, user-spoken, and transformed text are not limited to green, blue and red.

Any color may be used for the first, second, and third font colors as long as the colors are different from each other. A user may be allowed to change the default font color and size setting of user-typed, user-spoken, and transformed text in the preference menu 30. The input textbox 10 and the semantic echo textbox 20 may be left, right, centered, or fully justified. The default size of the input textbox 10 and the semantic echo textbox 20 is set so that about 50 average words may appear in each textbox without the user having to scroll. An average word may be defined as about 6 characters in length, including a space. The size of the input textbox 10 and the semantic echo textbox 20 may be altered from the default setting by a user in the preference menu 30. In one embodiment, the input textbox 10 and the semantic echo textbox 20 may alternatively change color from white to a first pastel color or a second pastel color respectively, several times per second to direct the user's focus of attention to the proper place, while appropriate. The first and second pastel colors may be any soft color. For example, the first pastel color may be light yellow and the second pastel color may be light green.

The "Yes" button 42, "No" button 44, and the "Enter Correction" button 46 become enabled when the semantic normalizer is in learning mode. Once enabled, all graphical buttons may assume a background color, such as steel grey, with black text until selected. The selection of any one of the graphical buttons is accompanied by an audio and/or visual cue, as well as a background color change. For example, in one embodiment, if the "Enter Correction" button 46 is selected an audible "click" may be heard by the user and the "Enter Correction" button 46 temporarily assumes a different background color. The background colors may be any color.

The preference menu 30 also allows a user to change the default operating mode of the semantic normalizer from predictive to learning mode. Once in learning mode, the GUI 100 may audibly and/or visually prompt a user to verify the accuracy of the semantically normalized text in the semantic echo textbox 20. For example, in one embodiment, the GUI 100 may enunciate the question, "Is this correct?" The user may reply verbally or by selecting one of the graphical buttons. If in answer to the question "Is this correct?" the user says "No" or selects the "No" button 44, the text from the input textbox 10 will be displayed in the semantic echo textbox 20 in black font. The user may then modify or re-enter the semantic echo, thus creating a new rule to be stored by the semantic normalizer. The preference menu 30 may also allow the user to specify the name of a knowledge base(s) to be opened or saved with "General" being the name of the default knowledge base(s).

Figure 2:
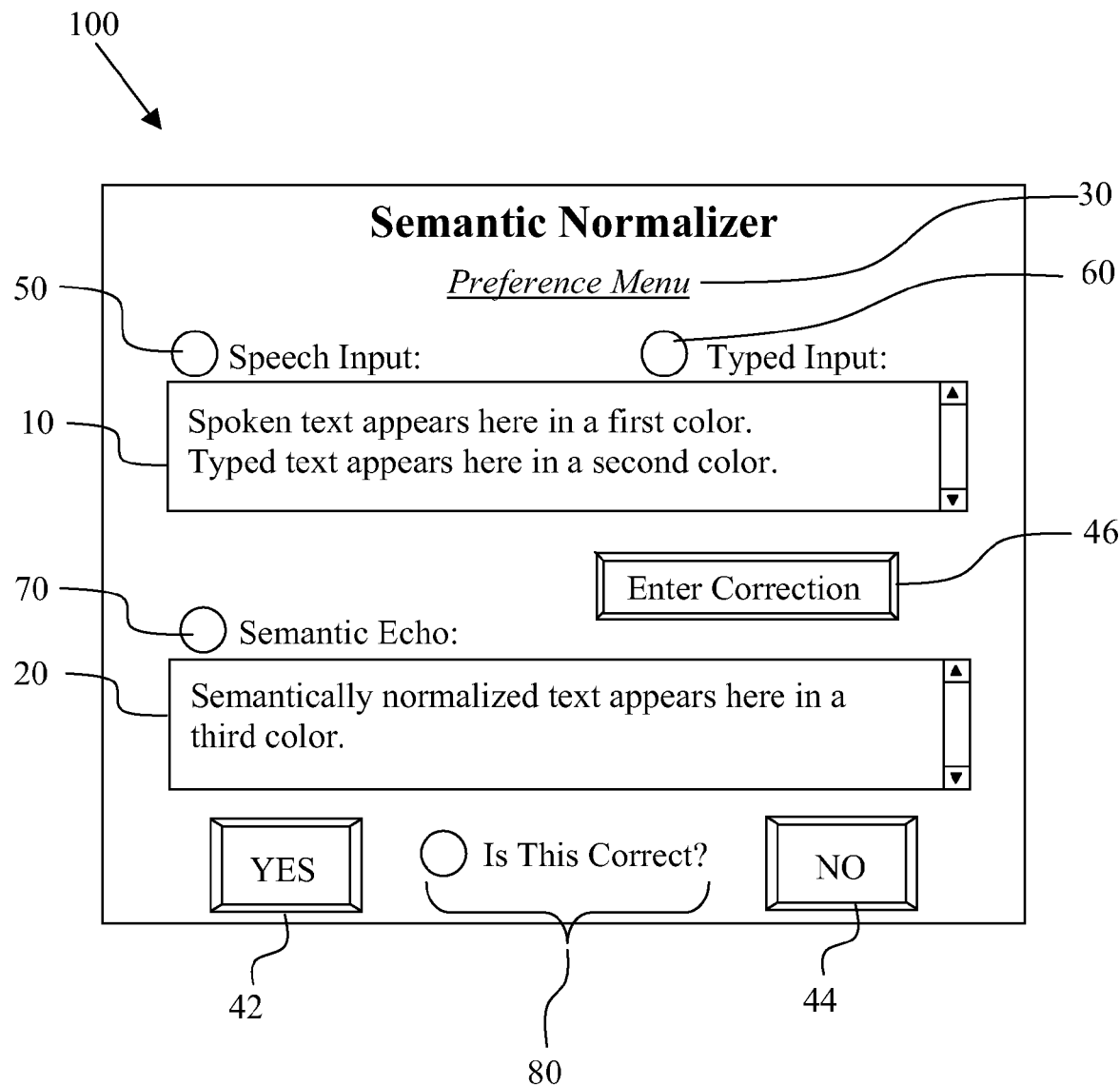
FIG. 2 shows another embodiment of a GUI for a natural language semantic normalizer further showing a speech input circle, a typed input circle, and a semantic echo circle.

FIG. 2 shows another embodiment of the GUI 100 further comprising a speech input circle 50, a typed input circle 60, and a semantic echo circle 70. The speech input circle 50 may be located adjacent to the input textbox 10 and is disposed to change from a background color to the same color as the second font color when the semantic normalizer detects speech. The typed input circle 60 may be located adjacent to the input textbox 10, and is disposed to change from a background color to the same color as the second font color when the semantic normalizer detects typed input. The semantic echo circle 70 is located adjacent to the semantic echo textbox 20, and is disposed to change from a background color to the same color as the third font color when the semantic normalizer displays semantically normalized text. FIG. 2 also shows a user prompt 80 comprising a colorable circle next to the question, "Is this Correct?". The colorable circle of the user prompt 80 may turn a fourth color if the semantic normalizer is in the learning mode and after semantically normalized text has been displayed in the semantic echo textbox 20. The fourth color may be any color that is distinct from the first, second, and third colors. For example, the fourth color may be white. The question: "Is this Correct?" may be enunciated by the semantic normalizer as well as displayed on the GUI 100.

Figure 3:
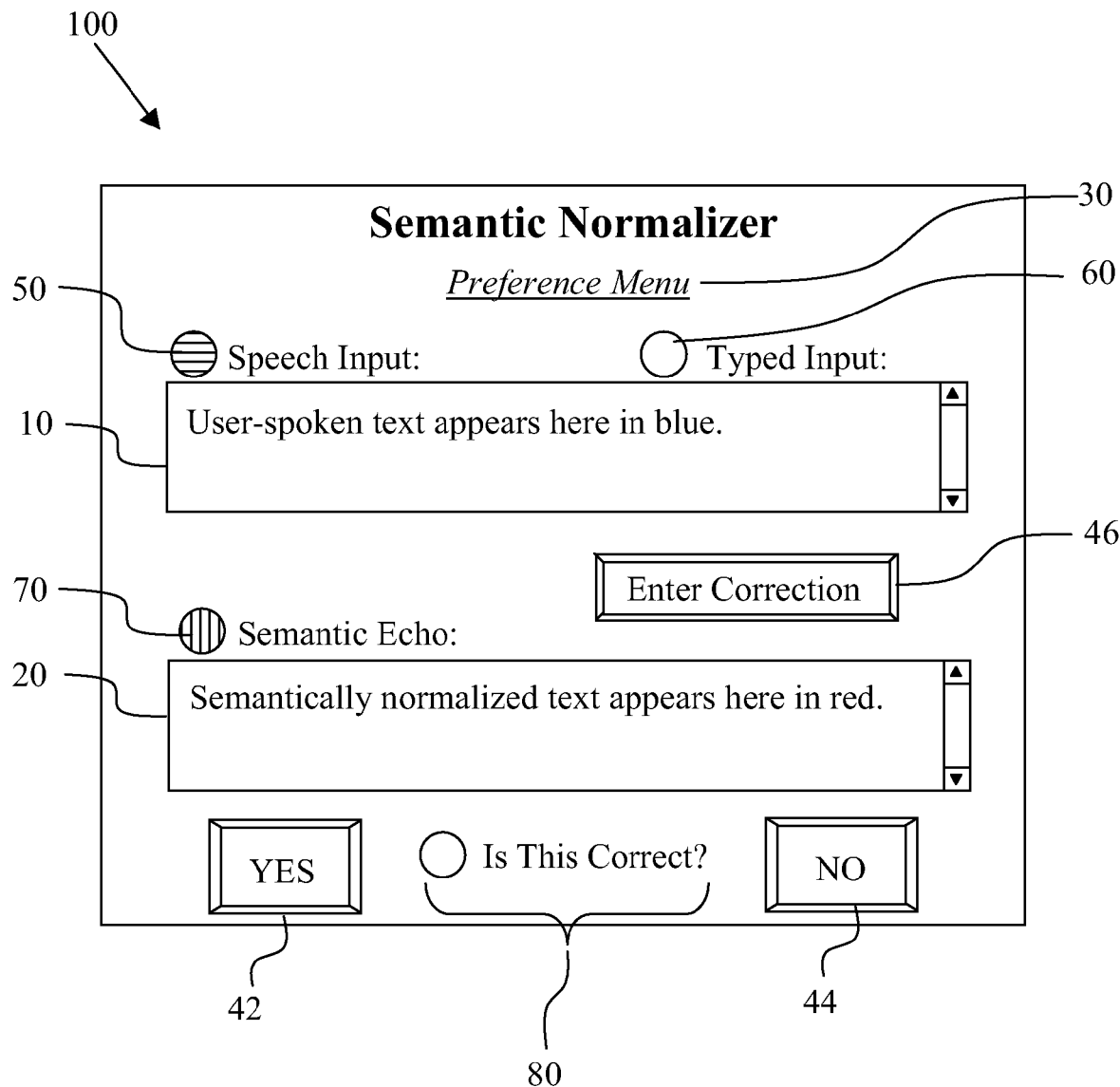
FIG. 3 shows an example embodiment of the GUI displaying spoken text in blue with accompanying blue speech input circle and a semantic echo in red.

FIG. 3 shows an example embodiment of the GUI 100 with red being the third font color and blue being the second font color. As shown in FIG. 3, when speech is detected by the semantic normalizer, the speech input circle 50 turns blue and the user-spoken text is displayed in the input textbox 10 in blue font. After a user submits the user-spoken text by saying "enter" or by selecting "enter" on a keyboard, the semantic echo circle 70 turns red and a semantically normalized form of the user-spoken text is displayed in the semantic echo textbox 20 in red font.

Likewise, when typed input is detected by the semantic normalizer, the typed input circle 60 may turn green and the typed input may be displayed in green font in the input textbox 10. After a user submits the user-typed text by saying "enter" or by selecting "enter" on a keyboard, the semantic echo circle 70 turns red and a semantically normalized form of the user-typed text is displayed in the semantic echo textbox 20 in red font. A unique audible signal, such as a "pop", may accompany the changing of color of any of the speech input circle 50, the typed input circle 60, or the semantic echo circle 70.

All semantic echoes may be enunciated as well as such user directives as, "Please Speak", "What did you say?" "I'm listening", etc. as chosen at random (using Java's built-in random function); Such equivalent expressions (synonyms) such as, "What I heard you say is (i.e., if the semantic echo is not transformed)," "What I believe you meant to say is (i.e., if the semantic echo is transformed)," "What I see you typed is (i.e., if the semantic echo is not transformed)," "What I believe you meant to write is (i.e., if the semantic echo is transformed)," or "Is this correct?", "Am I right?", "Did I get this one?", etc. The alternatives are chosen at random to give the semantic normalizer a more human-like feel. Statements to the effect of "YES", to the effect of "NO", or to the effect of "Computer, ENTER CORRECTION," are maintained in user files. The semantic normalizer may allow the user about a second to manually or verbally indicate the need to correct the selection, if necessary. The semantic normalizer may also enunciate each selection here using a randomly chosen synonym. Any voice recognition software may be used with the GUI 100.

Interaction between a user and the GUI 100 may create new, most specific rules for use by the semantic normalizer as follows: semantic echo→(Predictor output, i.e., updated semantic echo)|(speech input)|(typed input). The left-hand-side semantic echo, or antecedent is identified when the "NO" button 44 or "ENTER CORRECTION" button 46 is selected in response to the user prompt 80, "Is this correct?", or its equivalent. Similarly, the right-hand-side semantic echo, or consequent is identified when the "YES" button 42 is selected in response to the user prompt 80, "Is this correct?" Note that typed input can be semantically echoed too. If the user states, "ENTER CORRECTION," then the input textbox 10 will subsequently supply the consequent. The created rule is returned to the transformational generalization algorithm of the semantic normalizer.

In operation, the GUI 100 may be used as shown in the following example algorithm:

1. /* Accept user input and display system output. */
2. Process the preference menu 30 to update the default state (i.e., Prediction Mode or Learning Mode), font, color, type, and size as necessary. This algorithm assumes use of the default values (e.g., Prediction Mode). Both the input textbox 10 and the semantic echo textbox 20 are fully justified. A single "pop" sound may be used for all the "circle" tones and a distinct "click" used to register pressing or verbally selecting any button.
3. /* The computer's name may be set to any name that is readily recognized and rarely mistaken by voice recognition software. Even though the name "Computer" is used in the following example, it is to be understood that any readily recognizable name may be used. The computer may be named to more or less prevent the unintentional picking up of say the, "YES" command—as contrasted with, "YES Computer".*/
4. Enunciate, "an arbitrary user-friendly statement" at random once per ten or so trials.
5. Enunciate, "any friendly greeting phrase" as chosen at random.
6. /* The computer may address the user by name to make it more personal as follows. */
7. Repeat
    Enunciate, "What is your name?", "By what name shall I address you?", "By what name shall I call you?" etc. as chosen at random.
    Get name.
    Enunciate, "Your name is, name.", "I will call you, name.", "You are name." etc. as chosen at random.
    Enunciate, "Is that correct?", "Will that be satisfactory?", "May I continue", etc. as chosen at random.
    Get response.
    Until
    Response="Yes Computer", or "OK Computer", or "Continue Computer", or "Carry on Computer", "Yes Computer", or "OK Computer", or "Continue Computer", or "Carry on Computer", etc.
    Enunciate, "Thank you, name", "Very good, name", "Excellent, name", etc. as chosen at random.
8. Set all circles to steel grey. If the current mode is Prediction, disable all buttons. Otherwise, set all button fonts to black and all button colors to steel grey. Clear the semantic echo textbox 20. LHS(left hand side)←φ. Literal←False. /* Use Semantic Echo. */
9. L1: If Interrupt vector poll reveals system interrupt then stop process, offer the user the option to save files, and exit.
10. Clear the input textbox 10.
11. Enunciate, "Name, Please Speak", "What do you say, name?" "Name, I'm listening", etc. as chosen at random.
12. Set Speech Input circle 50 and input textbox 10 font to blue. Sound a short "pop" tone.
13. Flash the color of the input textbox 10 from white to a light yellow pastel several times per second until speech or a keyboard entry is detected.
14. On event an alphanumeric character is typed:
    Clear the input textbox 10.
    Set Speech Input circle 50 to grey.
    Set Typed Input circle 60 and input textbox 10 font to green. Sound a short "pop" tone.
    Display the first typed character.
15. If enter <voice mode>, or a carriage return <typewritten mode> is detected, then
    If Literal, go to L2. /* ENTER CORRECTION */
    Set the speech and typed input circles to steel grey <as appropriate>.
    Call the Predictor Algorithm. /* Transform the textual input. */

If the current mode is Speech Input, then
    If the returned text in the semantic echo textbox 20 is syntactically the same as the text in the input textbox 10, set the Semantic Echo circle 70 and semantically transformed text font to blue, sound a short "pop" tone, and enunciate, "Name, what I heard you say is" . . . . Else set the Semantic Echo circle 70 and the semantic echo textbox 20 text font to red, sound a short "pop" tone, and enunciate, "Name, what I believe you meant to say is" . . . .
Else /* the current mode is Typed Input */
    If the returned text is syntactically the same as the input, set the Semantic Echo circle 70 and the semantic echo textbox 20 text font to green, sound a short "pop" tone, and enunciate, "Name, what I see you typed is" . . . .
    Else set the Semantic Echo circle 70 and the semantic echo textbox 20 text font to red, sound a short "pop" tone, and enunciate, "Name, what I believe you meant to write is" . . . .

16. Flash the color of the semantic echo textbox 20 from white to a light green pastel several times per second, while enunciating the resultant contents of the semantic echo textbox 20. Wait until the enunciation is finished, then stop the flashing.
17. If the current mode is Prediction:
    Allow about a 3-second delay, during which time the system listens (i.e., including keyboard entry) for: "Computer, accept correction.", "Computer, effect repairs.", "Computer, accept changes.", "Accept correction.", "Effect repairs.", "Accept changes.", "Computer, no.", "Computer, stop.", "Computer, hold it.", "Computer, wait.", "No", "Stop", "Hold it", "Wait", etc. /* Disabled buttons in Prediction mode allow for unambiguous use of abbreviated commands. */
    If such a message is received, then
        Enunciate, "With regard to what I just said," "Pertaining to my last statement,"
        "Given my last statement," etc. as chosen at random.
        Set current mode to Learning /* This does not change default selection. */
    Else
        Clear the semantic echo textbox 20.
        Go to L1. /* Process another sentence. */
18. L2: Set the Semantic Echo circle 70 to steel grey.
19. Set the Is This Correct circle 80 to white. Sound a short "pop" tone.
20. /* Here is how to select a button and use synonyms for them. */
21. Randomly select and enunciate from among, "Is this correct, name?", "Am I right, name?", "Did I get this correct, name?", etc.
22. Set elapsed time to zero seconds.
23. /* Synonyms for YES, NO, or ENTER CORRECTION may be loaded in from a file(s). */
24. L3: If the user clicks on the YES button 42, or enunciates, "YES Computer", "Correct Computer", "OK Computer", "Affirmative Computer", etc. as chosen at random, then
    Enunciate "YES, name", "Correct, name", "OK, name", "Affirmative, name", etc. as chosen at random.
    Set the YES button 42 to green. Start button timer.
    Play a "mouse-click" sound.
    /* Acquire the RHS (right hand side): */
    If Literal, then
        RHS←correct literal input.
        Literal←False. /* Use Semantic Echo. */
    Else
        If LHS=φ, then LHS←correct semantic echo.
        RHS←correct semantic echo.
    If speech or keyboard activity detected: /* i.e., within about a second of button selection */
        Enunciate, "Name, I didn't get that", "Name, I missed that", "Name, what was that?", etc. as chosen at random.
        Go to L2.
    Set the YES button 42 to steel grey after a one-second delay.
    Set the IS THIS CORRECT? circle 80 to steel grey.
    Pass a transformation rule to the Learning Algorithm (i.e., LHS→RHS).
    LHS←φ.
    Clear the semantic echo textbox 20.
    Set current mode to default selection (i.e., Prediction or Learning).
    Go to L1. /* Process another sentence. */
25. Else if the user clicks on the NO button 44, or enunciates, "NO Computer", "Incorrect Computer", "Wrong Computer", "Negative Computer", etc. as chosen at random, then
    Enunciate "Name, NO", "Name, Incorrect", "Name, Wrong", "Name, Negative", etc. as chosen at random.
    Set the NO button 44 to red. Start button timer.
    Play a "mouse-click" sound.
    /* Use the semantic echo, not the input, for the antecedent because it will usually yield far more rule "cores" when paired with the correct consequent, since it is usually almost correct: */
    If LHS=φ, then LHS←wrong semantic echo. /* Save the first wrong answer. */
    If speech or keyboard activity detected: /* i.e., within about a second of button selection */
        Enunciate, "Name, I didn't get that", "Name, I missed that", "Name, what was that?", etc. as chosen at random.
        Go to L2.
    Set the NO button 44 to steel grey after a one-second delay.
    Enunciate, "Name, please correct this.", "I'm awaiting the correct input, name", "Name,
    I need the correct answer.", etc. as selected at random.
    Set the IS THIS CORRECT? circle 80 to steel grey.
    Set the Semantic Echo circle 70 and the semantic echo textbox 20 text font to black.
    If the current mode is Learning
        Semantic echo textbox 20←input textbox 10. /* Use literal textbox for Learning mode. */
        Go to L1 /* Find the correct RHS. */
26. Else if the user clicks on the ENTER CORRECTION button, or enunciates, "ENTER CORRECTION Computer", "Use Above Computer", "Take Literally Computer", "Don't Echo Computer", etc. as chosen at random, then
    Enunciate "Name, ENTER CORRECTION", "Name, Use Above", "Name, Take Literally", "Name, Don't Echo", etc. as chosen at random.
    Set the ENTER CORRECTION button 46 to yellow. Start button timer.
    Play a "mouse-click" sound.
    If LHS=φ, then LHS←wrong semantic echo. /* Save the first wrong answer. */

If speech or keyboard activity detected: /* i.e., within about a second of button selection */
   Enunciate, "Name, I didn't get that", "Name, I missed that", "Name, what was that?", etc. as chosen at random.
   Go to L2.
Set the ENTER CORRECTION button 46 to steel grey after a one-second delay.
Enunciate, "Name, please say or type the correct answer.", "Name, I need the correct answer.", "Name, what is the correct answer?", etc. as selected at random.
Literal True. /* Use only literal input. */
Set the IS THIS CORRECT? circle 80 to steel grey.
Set the Semantic Echo circle 70 and the semantic echo textbox 20 text font to black.
If the current mode is Learning
   Semantic echo textbox 20←input textbox 10. /* Use literal textbox for Learning mode. */
Go to L1/* Find the literal correct RHS. */
27. Else /* No button is pressed: */
   If at least 6 seconds have elapsed, go to L2. /* Remind the user to do something. */
   Go to L3. /* Loop until the user responds. */
28. /* The exact number of seconds may need to be set experimentally. */

From the above description of the GUI for the semantic normalization of natural language, it is manifest that various techniques may be used for implementing the concepts of the semantic normalizer GUI without departing from its scope. The described embodiments are to be considered in all respects as illustrative and not restrictive. It should also be understood that the semantic normalizer GUI is not limited to the particular embodiments described herein, but is capable of many embodiments without departing from the scope of the claims.

I claim:

1. A computer apparatus configured with a graphical user interface for a semantic normalizer, comprising:
   a predictor processor configured to:
   I) prompt a user to speak or type;
   II) flash a background color of an input textbox on a graphical user interface (GUI) of the semantic normalizer from white to a first pastel color several times a second until spoken text or typed text is detected by the semantic normalizer;
   III) perform the following steps if typed text is detected:
     a. setting the semantic normalizer to a typed input mode;
     b. setting a color of the typed input circle to a first color;
     c. setting the color of a speech input circle to the background color of the GUI;
     d. sounding a short audible signal; and
     e. displaying typed text in the input textbox, wherein the font color of the displayed typed text is the first color;
   IV) perform the following steps if spoken text is detected:
     a. setting the semantic normalizer to a speech input mode;
     b. setting the color of a speech input circle to a second color;
     c. setting the color of a typed input circle to a background color of the GUI;
     d. sounding a short audible signal; and
     e. displaying spoken text in the input textbox, wherein the font color of the displayed spoken text is the second color;
   V) perform the following steps after typed or spoken text has been submitted to the semantic normalizer, software for performing the following steps:
     a. setting the color of the speech input circle and the typed input circle to the background color of the GUI;
     b. obtaining resulting text from a Predictor Algorithm utilizing parallel hardware of the semantic normalizer;
     c. displaying the resulting text in a semantic echo textbox;
     d. if the resulting text has been transformed by the semantic normalizer,
        i. setting the color of a semantic echo circle to a third color;
        ii. sounding a short audible signal; and
        iii. setting the font color of the resulting text to the third color;
     e. if the semantic normalizer is in speech input mode and the resulting text is syntactically the same as the spoken text,
        i. setting the color of the semantic echo circle to the first color; and
        ii. setting the font color of the resulting text to the first color;
     f. if the semantic normalizer is in typed input mode and the resulting text is syntactically the same as the typed text,
        i. setting the color of the semantic echo circle to the second color; and
        ii. setting the font color of the resulting text to the second color; and
   a learning processor configured to perform the following steps if the semantic normalizer is in learning mode:
     a. prompting the user to verify the resulting text;
     b. enabling "Yes," "No," and "Enter Correction" buttons;
     c. setting the color of a circle that is adjacent to a printed question, "Is This Correct?" on the GUI to a fourth color; and
     d. allowing the user to enter corrections to the resulting text.

2. The apparatus of claim 1, wherein the graphical user interface is further configured to enunciate the resulting text by the semantic normalizer.

3. The apparatus of claim 1, wherein the graphical user interface is further configured to flash the background color of the semantic echo textbox from white to a second pastel color several times a second while the resulting text is being enunciated by the semantic normalizer.

4. The apparatus of claim 3, wherein the first, second, third, and fourth colors are distinct from one another.

5. The apparatus of claim 4, wherein the first, second, third, and fourth colors are green, blue, red and white respectively.

* * * * *